United States Patent [19]

Usui

[11] Patent Number: 4,792,161
[45] Date of Patent: Dec. 20, 1988

[54] STRUCTURE FOR CONNECTING ENDS OF EXHAUST PIPES

[75] Inventor: Masayoshi Usui, Numazu, Japan

[73] Assignee: Usui Kokusai Sangyo Kaisha, Ltd., Shizuoka, Japan

[21] Appl. No.: 162,497

[22] Filed: Mar. 1, 1988

[51] Int. Cl.$^4$ .............................................. F16L 21/02
[52] U.S. Cl. ....................................... 285/45; 285/114; 285/223; 285/231
[58] Field of Search ............... 285/223, 114, 231, 227, 285/318, 45, 235

[56] References Cited

U.S. PATENT DOCUMENTS

| | | | |
|---|---|---|---|
| 746,451 | 12/1903 | Brown | 285/223 X |
| 2,001,835 | 5/1935 | Cook | 285/235 X |
| 2,583,900 | 1/1952 | Spence | 285/235 X |
| 3,029,094 | 4/1962 | Parlasca et al. | 285/114 |
| 4,283,078 | 8/1981 | Ross et al. | 285/227 X |
| 4,526,409 | 7/1985 | Schaefer | 285/114 |

FOREIGN PATENT DOCUMENTS 1244446  9/1960  France ................................ 285/227
6502305  8/1965  Netherlands ...................... 285/114

Primary Examiner—Thomas F. Callaghan
Attorney, Agent, or Firm—Anthony J. Casella; Gerald E. Hespos

[57] ABSTRACT

A structure for connecting ends of exhaust pipes is disclosed. The structure for connecting is constituted by an annular elastic sealing member with heat resistance which is interposed between two overlapping surfaces of two cylinders in a temporally compressed manner, outwardly-projecting annular projection means each of which is disposed on the surfaces of the cylinders at the portions which do not overlap each other, a first coil spring member which is disposed at an adjustable interval above the surface of the cylinder, and two ends of which are secured to the annular projection means, a second coil spring member two ends of which are secured to two final coils of the first coil spring respectively, and which is disposed over the outer portion of the first coil spring in such a manner that the coil wire of the second coil spring is alternately disposed between the coil wire of the first coil spring.

5 Claims, 1 Drawing Sheet

STRUCTURE FOR CONNECTING ENDS OF EXHAUST PIPES

BACKGROUND OF THE INVENTION

1. Field of the Invention

This invention relates to an improvement of a structure for connecting the ends of exhaust pipes which is directed to preventing vibrations of exhaust pipes within an exhaust system of an automobile.

2. Description of the Prior Art

A connecting structure of the type described above is conventionally known in which, as shown in FIG. 3, adjacent ends of a pair of exhaust pipes 11 and 12 are connected and fastened 15 by means of a bellows pipe 13, the outer surface of the bellows pipe 13 being covered with a cylindrically-formed metallic net 14.

However, in this conventional connecting structure, the bellows pipe 13 and the cylindrically-formed metallic net 14 are usually formed of a thin material because the bellows pipe 13 needs to be formed in a wave-like expandable form and the portion which includes the cylindrically-formed metallic net 14 needs to be made flexible. As a result of this, the mechanical strength of the connecting structure deteriorates, causing it to crack or break or allowing exhaust gas to leak due to fatigue caused by vibration during usage or an external impact such as flying stones.

SUMMARY OF THE INVENTION

An object of the present invention is to provide a structure for connecting the end portions of exhaust pipes in which the vibration resistance and mechanical strength against external impacts are improved without any loss of ability to adjust the degree of flexibility, and in which, in addition, the good sealing capability provided will prevent the structure from experiencing cracks, breakages, leakage and so on.

The structure according to the present invention is characterized in that an annular elastic sealing member with heat resistance is interposed in a temporally compressed manner between two overlapping portions of two cylindrical surfaces of a pair of exhaust pipes each of which has an outwardly projecting annular projection mechanism at each of the front ends thereof in the connecting direction. Furthermore, two ends of a first coil spring having an annular cross section are fastened and connected to the above annular projecting mechanisms at an adjustable interval above the surface of the cylinder. An individual second coil spring having a triangular cross section is fastened to two final coils of the first coil spring in such a manner that it covers the first coil spring and the surface of the second coils spring is positioned in closely contact with each circular arcs of the wire of the first coil spring. As a result of this, the structure for connecting the ends of exhaust pipes is achieved. Furthermore, the annular projecting mechanisms are formed by projecting walls or flange members provided individually from the exhaust pipes.

DETAILED DESCRIPTION OF PREFERRED EMBODIMENTS

Figure 1:
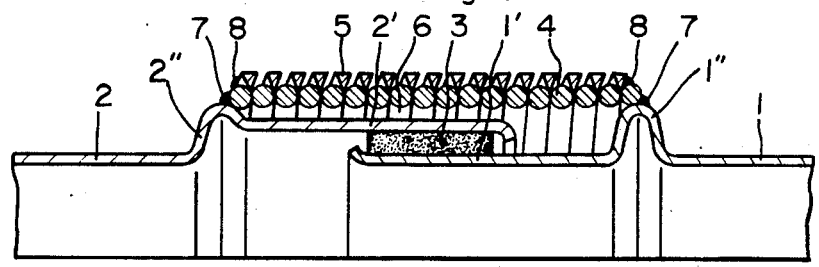
FIG. 1 is a half cross-sectional view of a connecting structure between front ends of exhaust pipes according to an embodiment of the present invention.
Figure 2:
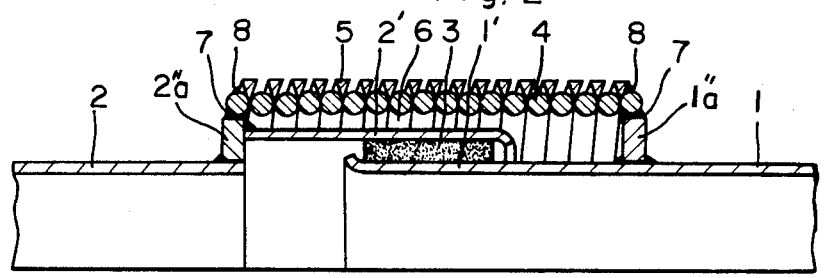
FIG. 2 is a view illustrating the same portion as that shown in FIG. 1 according to another embodiment of the present invention.
Figure 3:
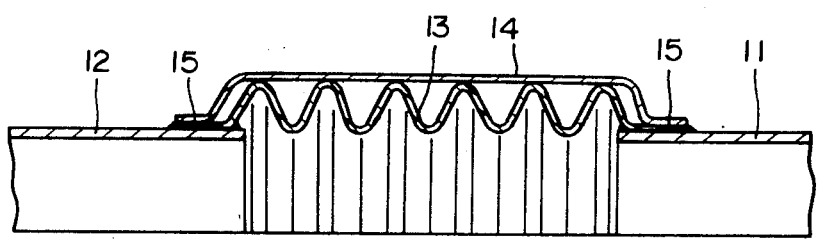
FIG. 3 is a half cross-sectional view of a conventional connecting structure.

In FIGS. 1 and 2, reference numerals 1 and 2 represent a pair of exhaust pipes each inside of which serves as an exhaust gas passage, and each of which has a cylindrical surface 1' and 2' respectively at the front end thereof in the connecting direction and an annular outwardly-projecting surface 1" and 2" respectively. Reference numeral 3 represents an annular sealing member made of steel wool, asbestos, or ceramic fiber or the like with heat resistance which is interposed between the overlapping portions of the cylindrical surfaces 1' and 2' of the pair of the exhaust pipes 1 and 2 in a temporally compressed manner. Reference numeral 4 represents a first coil spring having an annular cross section two ends of which are fastened 7 by welding or the like to the projecting surfacess 1" and 2" respectively around the outer cylindrical surface 2" of the overlapping portion at an adjustable interval 6. Reference numeral 5 represents a second coil spring having a triangular cross section which is disposed around the first coil spring 4 in such a manner that this second coil spring is positioned in close contact with the arc circular surface formed by the wire of the first coil spring 4. The two ends of the second coil spring 5 are fastened 8 to two final coils of the first coil spring 4 by welding or the like.

FIG. 2 shows an exmaple in which individual flange members 1a" and 2a" are welded to the exhaust pipes 1 and 2 for the purpose of fastening as an alternative to the annular projecting surfaces 1" and 2".

As described above, according to the present invention, the elastic sealing member 3 is interposed between the front cylindrical surfaces 1' and 2' in a temporally compressed manner. Furthermore, the projecting surfaces 1" and 2" or the welded flanges 1a" and 2a", which are respectively formed on the exhaust pipes 1 and 2, are connected each other by means of the first coil spring 4 at an adjustable interval 6. Furthermore, the first coil spring 4 is covered with the second coil spring 5 in a close-contact manner as describd above. As a result of this, free ends are created at the front ends of the cylindrical surfaces 1' and 2' of the exhaust pipes 1 and 2. Therefore, the exhaust pipes 1 and 2 can move freely within the adjustable interval 6 by means of the elastic deformation of the elastic sealing member 3. Furthermore, any vibration can be absorbed by means of the elastic sealing member 3, and sufficient sealing capability can be obtained. The second coil spring 5 follows the above described deflection of the first coil spring 4 with the close contact relationship between the two circular arc surfaces of the coil springs maintained, whereby it can deform freely in any directions including the radial direction.

As described above, since the connecting structure according to the present invention is constituted by the elastic sealing member 3, first coil spring 4 and the second coil spring 5, the vibration resistance and sealing capability can be obtained by means of the elastic sealing member 3, and furthermore, a sufficient mechanical strength can be obtained thanks to the provision of the first coil spring 4 and the second coil spring 5. As a result of this, extremely advantageous connecting structure can be obtained exhibiting a long life without any occurrence of cracks, breakage, exhaust gas leakage or the like.

I claim:

1. A structure for connecting ends of exhaust pipes comprising:
- an annular elastic sealing member with heat resistance which is interposed between two overlapping surfaces of two cylinders in a temporally compressed manner;
- outwardly-projecting annular projection means each of which is disposed on said surfaces of said cylinders at the portions which do not overlap each other;
- a first coil spring member which is disposed at an adjustable interval above said surface of said cylinder, and two ends of which are secured to said annular projection means;
- a second coil spring member two ends of which are secured to two final coils of said first coil spring respectively, and which is disposed over the outer portion of said first coil spring in such a manner that the coil wire of said second coil spring is alternately disposed in close contact between the coil wire of said first coil spring.

2. A structure for connecting ends of exhaust pipes according to claim 1, wherein said first coil spring member has an annular cross section and said second coil spring member has a triangular cross section.

3. A structure for connecting ends of exhaust pipes according to claim 1, wherein said annular projection means comprises annular projecting walls which are formed on the surfaces of said cylinders.

4. A structure for connecting ends of exhaust pipes according to claim 1, wherein said annular projection means comprises flange members welded to said surfaces of said cyliders.

5. A structure for connecting ends of exhaust pipes according to claim 1, wherein said annular sealing member comprises steel wool, asbestos, or ceramic fiber.

* * * * *